US009372390B2

(12) United States Patent
Brearey et al.

(10) Patent No.: US 9,372,390 B2
(45) Date of Patent: Jun. 21, 2016

(54) THERMAL PROCESSOR EMPLOYING RADIANT HEATER

(71) Applicant: Carestream Health, Inc., Rochester, NY (US)

(72) Inventors: Robert R. Brearey, Oakdale, MN (US); John T. Olson, Burnsville, MN (US); Kent R. Struble, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 179 days.

(21) Appl. No.: 14/151,096

(22) Filed: Jan. 9, 2014

(65) Prior Publication Data

US 2014/0126895 A1 May 8, 2014

Related U.S. Application Data

(62) Division of application No. 13/154,626, filed on Jun. 7, 2011, now Pat. No. 8,660,414.

(60) Provisional application No. 61/416,826, filed on Nov. 24, 2010.

(51) Int. Cl.

| | |
|---|---|
| ***F21V 9/00*** | (2015.01) |
| ***A21B 2/00*** | (2006.01) |
| ***F26B 13/10*** | (2006.01) |
| ***G03D 13/00*** | (2006.01) |

(52) U.S. Cl.
CPC .................................... *G03D 13/002* (2013.01)

(58) Field of Classification Search
None
See application file for complete search history.

(56) References Cited

U.S. PATENT DOCUMENTS

| | | | |
|---|---|---|---|
| 3,436,523 | A | 4/1969 | Umahashi et al. |
| 3,632,984 | A | 1/1972 | Brownscombe |
| 3,739,143 | A | 6/1973 | Amundson et al. |
| 5,839,043 | A | 11/1998 | Okabayashi et al. |
| 5,975,772 | A | 11/1999 | Imai et al. |
| 5,990,461 | A | 11/1999 | Stumpf et al. |
| 6,020,909 | A | 2/2000 | Kocher et al. |
| 6,122,476 | A | 9/2000 | Bowler, Jr. |
| 6,324,376 | B1 | 11/2001 | Koguchi |

(Continued)

FOREIGN PATENT DOCUMENTS

| | | |
|---|---|---|
| CN | 1846458 | 10/2006 |
| EP | 0 460 207 | 5/1995 |

(Continued)

OTHER PUBLICATIONS

Chinese Search Report for Application No. 201110394113.0, filed Nov. 23, 2001, pp. 2.

*Primary Examiner* — Thor Campbell

(57) ABSTRACT

A thermal processor including a rotatable hollow drum including a drum core having an interior surface and an exterior surface, and a radiant heater positioned within an interior of the drum and configured to provide radiant energy to heat the drum, wherein at least one radiant energy absorption characteristic of the interior of the drum varies across its longitudinal width $W_d$ so that selected areas of the interior of the drum absorb more radiant energy than other areas of the interior of the drum so as to compensate for non-uniform heat loss from the drum and to provide the exterior surface of the drum core at a desired temperature which is substantially uniform across the longitudinal width of the drum core.

5 Claims, 8 Drawing Sheets

(56) References Cited

U.S. PATENT DOCUMENTS

| | | | |
|---|---|---|---|
| 6,898,410 | B2 | 5/2005 | Boss |
| 6,978,110 | B2 | 12/2005 | Nakayama |
| 7,079,801 | B2 | 7/2006 | Nakayama |
| 7,167,193 | B2 | 1/2007 | Goetzke et al. |
| 7,399,947 | B2 | 7/2008 | Rassatt et al. |
| 2003/0095818 | A1 | 5/2003 | Nakayama |
| 2005/0061792 | A1 | 3/2005 | Kagawa et al. |
| 2006/0289418 | A1 | 12/2006 | Konishi et al. |
| 2008/0124148 | A1 | 5/2008 | Kim et al. |

FOREIGN PATENT DOCUMENTS

| | | |
|---|---|---|
| EP | 0 915 395 | 5/1999 |
| JP | S59-061863 | 4/1984 |
| JP | 09-134086 | 5/1997 |
| JP | H09-166935 | 6/1997 |
| JP | 2005-085682 | 3/2005 |
| JP | 2008-139825 | 6/2008 |

THERMAL PROCESSOR EMPLOYING RADIANT HEATER

CROSS REFERENCE TO RELATED APPLICATIONS

This is a Divisional of U.S. patent application Ser. No. 13/154,626, entitled "THERMAL PROCESSOR EMPLOYING RADIANT HEATER" by Brearey et al., filed on Jun. 7, 2011, which claimed priority to Provisional U.S. Patent Application Ser. No. 61/416,826, entitled "THERMAL PROCESSOR UTILIZING RADIANT HEATER" by Brearey et al., filed Nov. 24, 2010, the disclosure of all applications being incorporated by reference in this application.

FIELD OF THE INVENTION

The present invention relates generally to an imaging apparatus, and more specifically to a thermal processor for thermally developing an imaging material employing a radiant heat source.

BACKGROUND OF THE INVENTION

Light sensitive photothermographic or heat sensitive film generally includes a base material, such as a thin polymer or paper, which is coated, typically on one side, with an emulsion of heat sensitive material, such as dry silver. Once such film has been subjected to photostimulation to form a latent image thereon, such as via a laser of a laser imager, a thermal processor is employed to develop the latent image through application of heat. Generally, such film is processed or developed at a temperature in the vicinity of 120 degrees centigrade for a required development time. In order to produce a high quality developed image, heat transfer to the photothermographic film must be controlled during the development process. If heat transfer is not uniform during development, visual artifacts, such as non-uniform density and streaking, may occur. If heat is transferred too quickly, the base of some types of film can expand too quickly, resulting in expansion wrinkles that create visual artifacts in the developed image.

Several image processing machines have been developed for thermally processing photothermographic film in efforts to achieve optimal heat transfer to the photothermographic film during development. One type of thermal processor is commonly referred to as a drum processor which employs a rotating heated drum to transfer heat to the film as it wraps around at least a portion of a circumference of the drum during processing. One type of drum processor employs a drum which is heated by an electric blanket heater coupled to an interior surface of the drum, and a series of pressure rollers positioned about a segment of the external circumference of the drum. During development, rotation of the drum draws the photothermographic film between the drum and the pressure rollers, with the pressure rollers typically holding the emulsion side of the film in contact with the drum. As the film is wrapped around at least a portion of the exterior circumference of the drum as it passes through the processor, thermal energy is transferred from the drum to the film so as to heat and maintain the film at a desired development temperature for a desired development time.

However, during operation of the processor, heat loss from the drum is not uniform and, if not compensated for, can result in visual artifacts in the developed film. For example, during idle times (when no film is being processed), heat is lost more rapidly near the ends of the drum than in the middle portion of the drum. Conversely, during processing, because the film has a width which is less than that of the drum, as heat is transferred to the film more heat is lost from the middle portion of the drum than is lost at the ends of the drum. In attempts to maintain a uniform temperature across the width of the drum at all times, some electric blanket heaters with only a single zone are configured with a varying watt-density so as to provide more thermal energy at the drum ends as compared to the drum middle (e.g. end vs. middle watt-density). Other electric blanket heaters employ multiple, individually controllable heat zones which are controlled so as to provide more heat to the end portions of the drum during idle times and to provide more heat to the middle portion during processing.

While electric blanket heaters are effective at maintaining an even temperature across a width of the drum during both processing and idle times, blanket heaters can be expensive relative to the cost of an image processor as a whole, particularly for low volume processors (i.e. processors intended for use in environments having low volume film processing requirements). In light of the above, there is a need for a cost effective photothermographic film processor that provides even film heating during processing.

SUMMARY OF THE INVENTION

An object of the present invention is to provide a processor employing a drum heated by a radiant heater for thermally developing photothermographic film.

Another object of the present invention is to compensate for non-uniform heat loss from the drum so that a development temperature of an external surface of the drum is substantially uniform across the longitudinal width and about the circumference of the drum.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a thermal processor including a rotatable hollow drum including a drum core having an interior surface and an exterior surface, and a radiant heater positioned within an interior of the drum and configured to provide radiant energy to heat the drum. At least one radiant energy absorption characteristic of the interior of the drum varies across a longitudinal width of the drum so that selected areas of the interior of the drum absorb more radiant energy than other areas of the interior of the drum so as to compensate for non-uniform heat loss from the drum and to provide the exterior surface of the drum core at a desired temperature which is substantially uniform across a longitudinal width of the drum core.

According to one aspect of the invention, the at least one radiant energy absorption characteristic is an emissivity of the interior surface of the drum core, and wherein the emissivity of the interior surface of the drum core varies across the lateral width of the drum core.

According to one aspect of the invention, the emissivity is greater at end portions of the interior surface of the drum core relative to a middle portion of the interior surface of the drum core.

According to one aspect of the invention, the at least one radiant energy absorption characteristic is a surface area of the interior surface of the drum core, and wherein the surface area per unit of length of the interior surface is varied across a longitudinal width of drum core.

According to one aspect of the invention, there is provided a method of operating a thermal processor for thermally developing photothermographic film. The method includes positioning a radiant heater within an interior of a rotating hollow drum, the radiant heat providing radiant energy to heat the hollow drum, and modifying radiant energy absorption characteristics of an interior surface of the hollow drum so that selected areas of the interior surface of the drum absorb more radiant energy than other areas of the interior surface of the drum in order to compensate for non-uniform heat loss from the hollow drum so that the exterior surface of the hollow drum has a temperature which is substantially uniform across a longitudinal width of the drum.

According to one aspect of the invention, there is provided a thermal processor for thermally developing photothermographic film including a rotatable hollow drum including a drum core having an interior surface and an exterior surface, a radiant heater positioned within an interior of the drum and configured to provide radiant energy to heat the drum, and a temperature sensor mounted to and extending about a circumference of a middle portion of the interior surface of the drum core and having opposing ends which are offset from and overlapping one another, wherein the temperature sensor is embedded within an insulating material, and wherein the insulating material facing the interior of the drum core has an overcoat layer with an emissivity less than that of interior surface of the middle portion of the drum core.

By non-uniformly heating the drum core across its longitudinal width so as to compensate for non-uniform heat loss from the drum core, a substantially uniform temperature is achieved across the longitudinal width of the exterior surface of the drum so that when a sheet of photothermographic film is thermally developed, the photothermographic film is uniformly processed across a width of the sheet (i.e. the cross-web processing is uniform). Further, by accurately measuring the temperature of the drum about its circumference, the circumferential temperature of the drum can be accurately controlled so that the photothermographic film is processed uniformly along its length (i.e. the down-web processing is uniform).

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
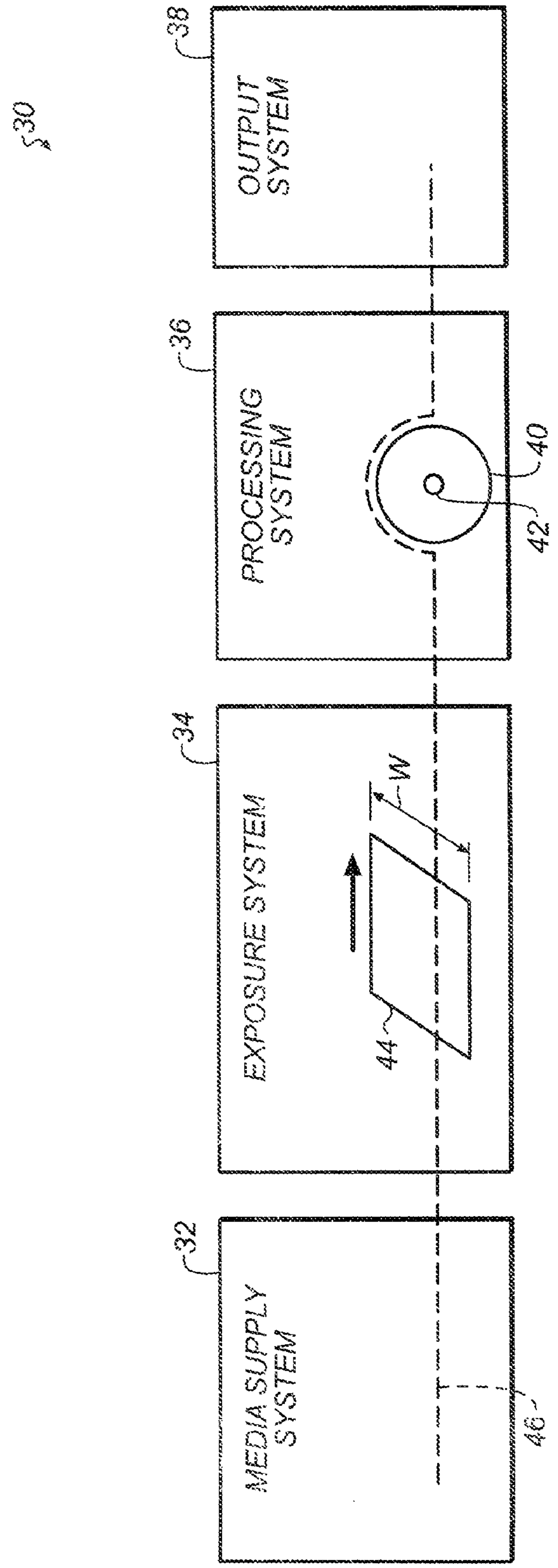
FIG. 1 shows a block illustrating generally an imaging apparatus employing a radiant heat source according to embodiments of the present disclosure.

FIG. 1 is a block and schematic diagram illustrating generally an example of an imaging apparatus 30 having a thermal processor employing a radiant heater according to embodiment of the present application. Imaging apparatus 30 includes a media supply system 32, an exposure system 34, a processing system 36, and an output system 38. According to embodiments which will be described in greater detail herein, processing system 36 includes a drum-type processor 40 employing a radiant heater 42 for thermally processing photothermographic film.

In operation, media supply system 32 provides, such as from a film cassette, an unexposed photothermographic film, such as film 44, to exposure system 34 along a transport path 46. Exposure system 34 exposes a desired photographic image on film 44 based on image data (e.g. digital or analog) to form a latent image of the desired photographic image on film 44. In one embodiment, exposure system 34 exposes the desired photographic image via a laser imager. Processing system 36 receives the exposed film 44 from exposure system 34, and drum-type processor 40 heats exposed film 44 using thermal energy provided by radiant heater 42 to thermally develop the latent image. Processing system 36 subsequently cools and delivers developed film 44 along transport path 46 to output system 38 (e.g. an output tray or sorter) for access by a user.

Figure 2:
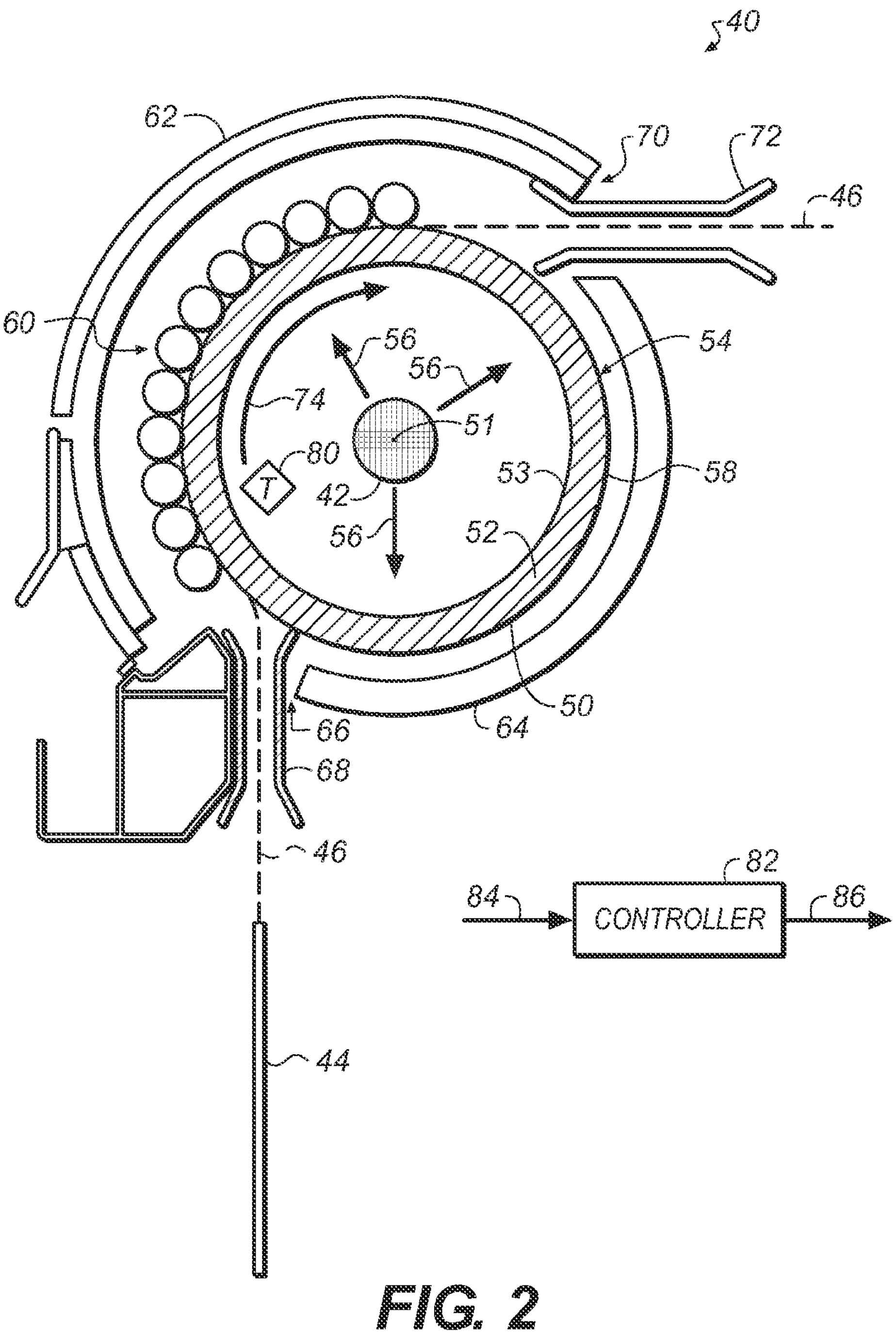
FIG. 2 shows a lateral cross-sectional view illustrating portions of the drum-type processor of FIG. 1, according to one embodiment.

FIG. 2 is a lateral cross-sectional view illustrating portions of drum-type processor 40, according to one embodiment, which includes a rotatable processor drum 50 having a drum core 52 with an interior surface 53 and an exterior surface 54 and with radiant heater 42 positioned within an interior thereof along a longitudinal rotational axis 51 of processor drum 50. Radiant heater 42 is configured to provide radiant thermal energy, as illustrated by arrows 56, to the interior surface 53 of drum core 52 so as to heat drum core 52 and maintain an exterior surface of drum core 52 at a desired development temperature of film 44. According to one embodiment, the exterior surface 54 of drum core 52 is has a coating 58 (illustrated by the heavy line), such as silicone rubber, for example. A plurality of pressure rollers 60 is circumferentially arrayed along a segment of drum core 52 and configured to hold film 44 in contact with coating 58 of drum core 52 during the film development process.

According to one embodiment, drum-type processor 40 includes upper and lower covers 62 and 64 which are spaced from processor drum 50 and pressure rollers 60 and which define an entrance 66 at which an entrance guide 68 is positioned and an exit 70 at which an exit guide 72 is positioned. During operation, drum-type processor 40 is driven so as to rotate in a direction as indicated by directional arrow 74. A sheet of exposed film 44, having a latent image exposed thereon, is received along transport path 46 from exposure system 34 (see FIG. 1) and is directed to processor drum 50 by entrance guide 68. Exposed film 44 is then drawn between coating 58 and pressure rollers 60 and transported along transport path 46 around a portion of the exterior of processor drum 50, where it is heated to and maintained at the desired development temperature for a desired time by absorbing thermal energy from drum core 52 via coating 58 before being directed out of exit 70 via exit guide 72. The developed film 44 is then directed along transport path 46 to output system 38 (see FIG. 1).

According to one embodiment, as will be described in greater detail below, drum-type processor 40 includes a temperature sensor 80, positioned within the interior of processor drum 50, and a controller 82. According to one embodiment, temperature sensor 80 is mounted to interior surface 53 of drum core 52. During operation of processor 40, controller 82 receives a temperature signal 84 from temperature sensor 80 and controls radiant heater 42, via a control signal 86, to maintain a temperature of exterior surface 54 and coating 58 at a desired temperature (e.g. the development temperature of film 44). According to one embodiment, controller 82 controls the amount of radiant thermal energy 56 provided by radiant heater 42 by turning radiant heater "on" and "off".

As described above, conventional drum-type processors for thermally typically employ blanket heaters mounted to the inside surface of the drum core, wherein the blanket heaters have zones with different power densities or separately controllable zones in order to precisely apply heat and compensate for non-uniform heat loss from the drum (e.g. more heat loss at drum ends during idle times, and more heat loss from central portions of the drum during film processing). As described below, radiant type heaters, such as radiant heater 42, do not themselves readily provide such precise heating control.

Figure 3:
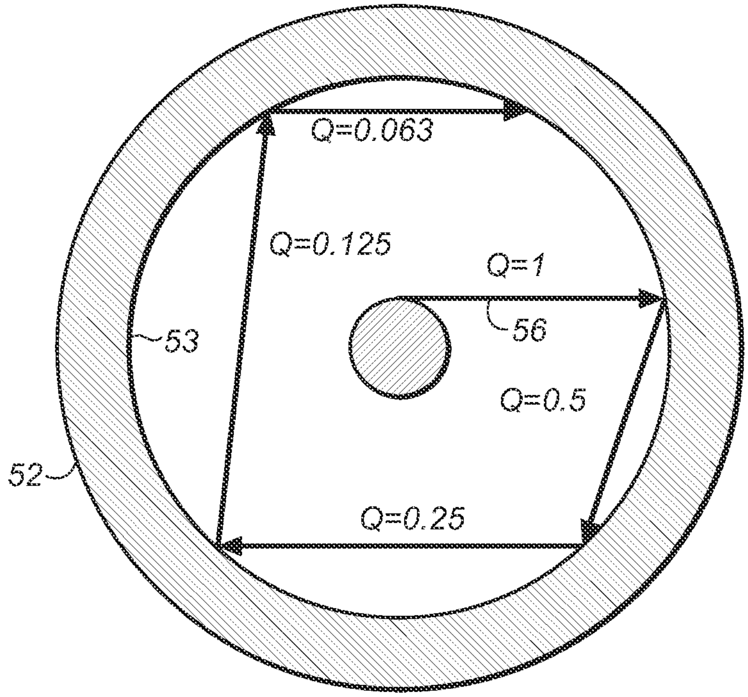
FIG. 3 shows a longitudinal cross-sectional view generally showing the drum-type processor of FIG. 2, according to one embodiment, and generally illustrating the heating of the drum core by a radiant heater.

FIG. 3 is a longitudinal cross-sectional view showing portions of drum-type processor 40, according to one embodiment, and generally illustrates the heating of drum core 52 by radiant heater 42. FIG. 3 illustrates a single ray 56 of radiant energy being emitted from a single point along a length of radiant heater 42. According to one embodiment, as will be described in greater detail below, radiant heater 42 comprises a linear heater positioned along the rotational axis of processor drum 50 and extending from one end of processor drum 50 to the other. The amount of energy absorbed by drum core 52 from initial contact with ray 56 depends upon the emissivity of drum core 52. The emissivity of a material is defined as the relative ability of its surface to emit energy by radiation and is the ratio of energy radiated by a particular material to energy radiated by a black body at the same temperature. A material having an emissivity of "0" would be completely reflective, while a material having an emissivity of "1" would be completely absorbent.

As illustrated by FIG. 3, if interior surface 53 of drum core 52 has an emissivity of 0.5 and ray 56 emitted by radiant heater 42 has an energy level of Q=1, drum core 52 will absorb 50% of the thermal energy at a first location and reflect 50% in the form of a first reflected ray having an energy level of Q=0.5 which, in-turn, will have 50% of its energy absorbed by drum core 52 at a second location and have 50% reflected in the form of second reflected ray having an energy level of Q=0.25 which, in-turn, will have 50% of its energy absorbed by drum core 52 at a third location and have 50% reflected in the form of third reflected ray having an energy level of Q=0.125 which, in-turn, will have 50% of its energy absorbed by drum core 52 at a fourth location and have 50% reflected in the form of fourth reflected ray having an energy level of Q=0.063, and so on, until eventually all of the energy of the original ray is absorbed by drum core 52. Again, it is noted that FIG. 3 illustrates only a single ray of radiant energy emitted by radiant heater 42, and that radiant heater 42 emits radiant energy at all angles along its entire length.

While the reflecting of radiant energy in this fashion tends to heat drum core 52 substantially uniformly along a given circumference, in contrast to electric blanket heaters, it is difficult to precisely control exactly where the radiant energy from radiant heater 42 is directed. As will be described in greater detail below, it is difficult to maintain end portions and a middle portion of drum core 52 at a same temperature across a longitudinal width of drum core 52.

Figure 4:
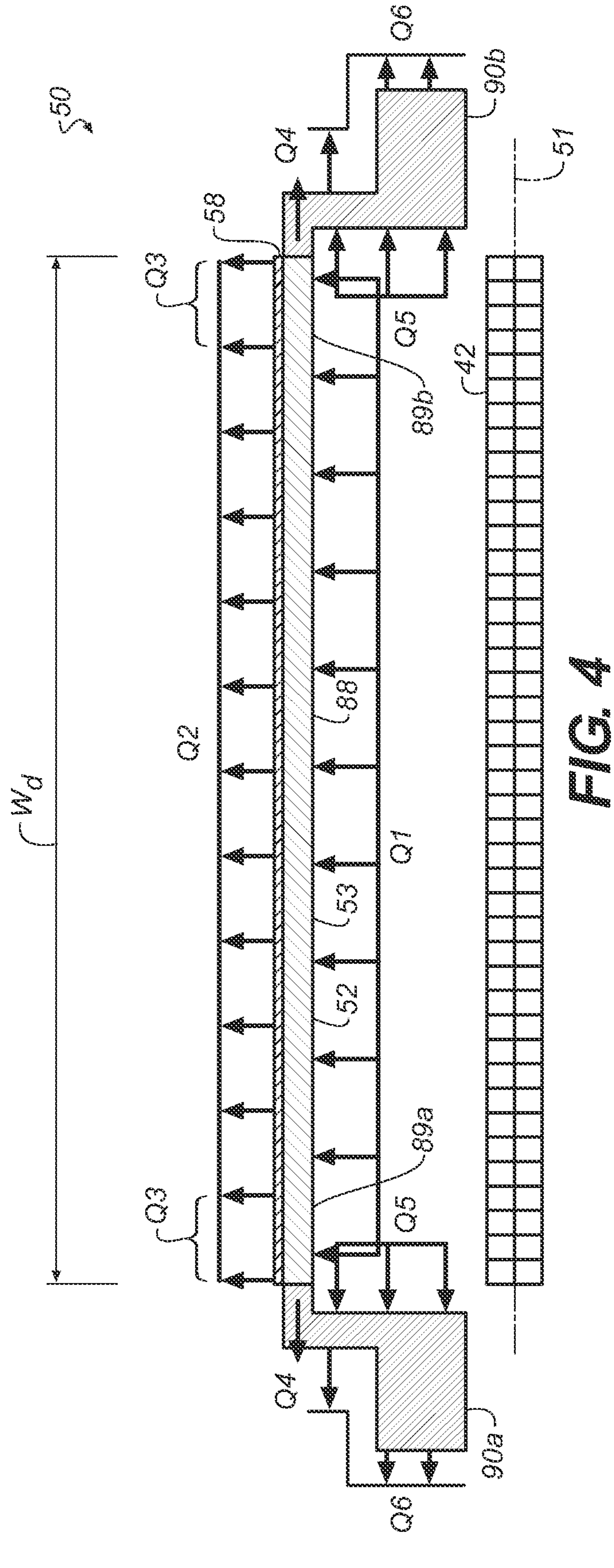
FIG. 4 shows a longitudinal cross-section showing portions of the drum-type processor of FIG. 2 and generally illustrates heat flows of the drum-type processor when operating in an idle mode.

FIG. 4 is a longitudinal cross-section showing portions of drum-type processor 40 and processor drum 50 and generally illustrates heat flows of drum-type processor 40 when operating in an idle mode, wherein radiant heater 42 is providing radiant energy to rotating processor drum 50, but no film is being processed. For ease of illustration, it is noted that only an upper half of processor drum 50 above rotational axis 51 is shown in FIG. 4. In FIG. 4, Q1 represents the thermal energy or heat flow into drum core 52 from radiant heater 42 via interior surface 53. Q2 and Q3 respectively represent heat flow from a middle portion 88 and end portions 89*a*, 89*b* of drum core 52 to an external environment (e.g. air within a room in which drum-type processor 40 is located). As illustrated by FIG. 4, when operating in the idle mode, Q2 and Q3 are substantially equal. Q4 represents heat flow from drum core 52 to the external environment via end caps 90*a*, 90*b* mounted to the end portions 89*a*, 89*b* of drum core 52. Additionally, Q5 represents heat flows provided to end caps 90*a*, 90*b* by radiant heater 42, and Q6 represents heat flow from end caps 90*a*, 90*b* to the external environment.

It is noted that, according to one embodiment, end caps 90*a*, 90*b* are formed from a thermoplastic material and act as hubs or pinions about which processor drum 50 rotates. According to one embodiment, the ends of radiant heater 42 are mounted to end caps 90*a*, 90*b*. In one embodiment, radiant heater 42 is electrically connected via a brush-type connector or sliding-type connector to an external power supply such that radiant heater 42 rotates with drum core 52 and end caps 90*a*, 90*b*. In one embodiment, radiant heater 42 is coupled to end caps 90*a*, 90*b* via bushings or bearing-type connectors such that radiant heater 42 remains stationary during rotation of drum core 52 and end caps 90*a*, 90*b*.

Figure 5:
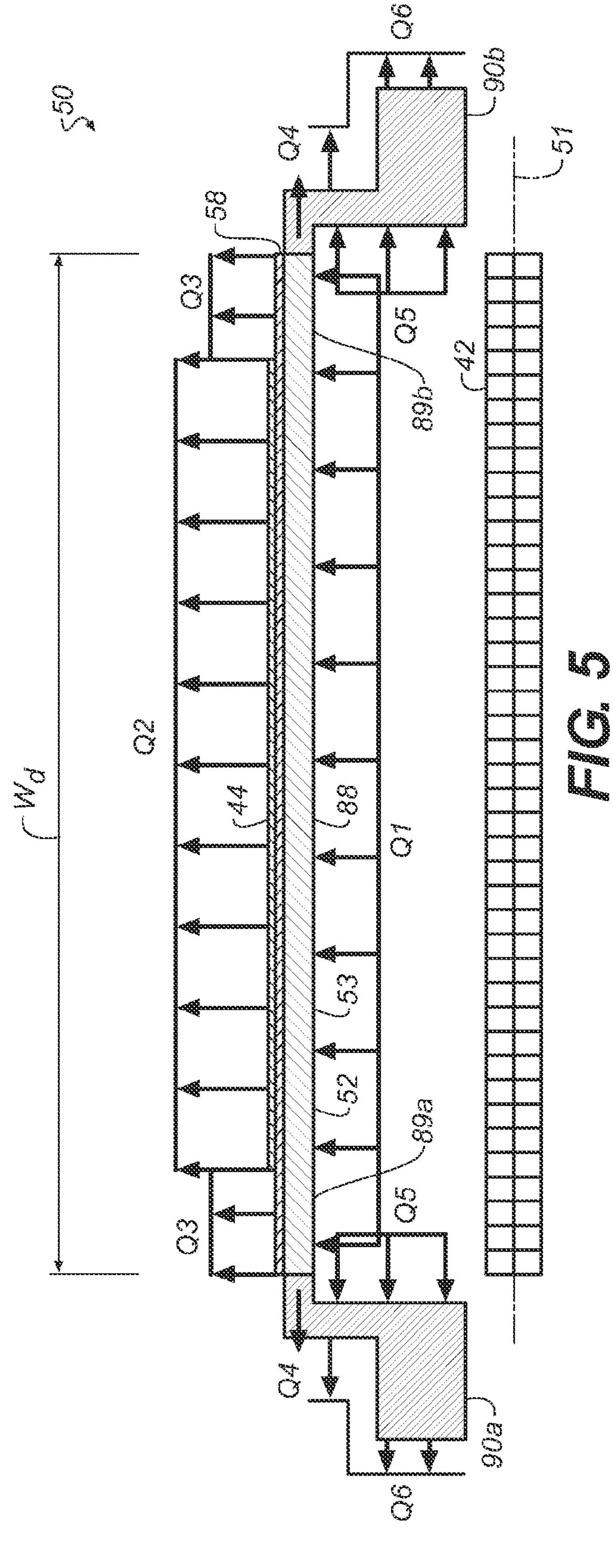
FIG. 5 shows a longitudinal cross-section showing portions of the drum-type processor of FIG. 2 and generally illustrates heat flows of the drum-type processor when operating in a processing mode.

FIG. 5 is a longitudinal cross-section showing portions of drum-type processor 40 and processor drum 50 and generally illustrates heat flows of drum-type processor 40 when operating in a processing mode, wherein radiant heater 42 is providing radiant energy to rotating processor drum 50 and an exposed film 44 is being processed. As in FIG. 4, Q1 represents the thermal energy or heat flow into drum core 52 from radiant heater 42 via interior surface 53, Q3 represents heat flows from end portions 89*a*, 89*b* of drum core 52 to the external environment via exterior surface 54, Q4 represents heat flows from drum core 52 to the external environment via end caps 90*a*, 90*b*, Q5 represents heat flows provided to end caps 90*a*, 90*b* by radiant heater 42, and Q6 represents heat flow from end caps 90*a*, 90*b* to the external environment. However, in the processing mode, Q2 represents the heat flow which is absorbed by film 44 for thermal development of the latent image thereon as well as that transmitted to the external environment. As illustrated by FIG. 5, when operating in the processing mode, Q2 is greater in magnitude than Q3, as film 44 absorbs more heat than is lost to the environment at end portions 89*a*, 89*b* via exterior surface 54.

With reference to FIGS. 4 and 5 above, during the idle mode of drum-type processor 40 (see FIG. 4), because heat is lost from the end portions 89*a*, 89*b* of drum core 52 via heat flows Q3 from exterior surface 54, and via heat flows Q4 from end caps 90*a*, 90*b*, the amount of heat lost per unit of surface area from the end portions 89*a*, 89*b* of drum core 52 tends to be greater than that lost from middle portion 88 During the processing mode of drum-type processor 40 (see FIG. 5), the amount of heat Q4 lost from middle portion 88 of drum core 52 rises relative to the idle state when no film 44 is present. If not compensated for, these relative changes in heat flow across the width, Wd, of drum core 52 can cause temperature variations can result in non-uniform cross-web processing of the film which, in-turn, may adversely affect image properties of the developed film (e.g. incorrect image density).

Unless compensated for, these relative differences and changes in heat flow across the width, Wd, of drum core 52 can cause temperature differences between middle portion 88 and end portions 89*a*, 89*b* which, in turn, can result in a non-uniform heat transfer across a width (W) of film 44 (see FIG. 1) and produce incorrect image densities in the developed film 44. Depending on the volume of film developed by the process in a given time, the difference in heat flows between the end portions 89*a*, 89*b* and middle portion 88 of drum core 52 during idle mode can be of particular concern. For example, for a low-volume processor (e.g. a processor developing fewer than 70 films per hour, say 40 films/hour, or even fewer, as opposed to a high-volume processor developing 180 films/hour for instance), this condition can result in the lateral edges of film 44 being underdeveloped (i.e. darker) relative to the middle portion of the film 44. Although, as described above, while the middle portion 88 of drum core 52 tends to lose more heat than end portions 89*a*, 89*b* during the processing mode, which could cause the temperature of middle portion 88 to become cooler relative to end portions 89*a*, 89*b* over time, such a situation is not as great of a concern in a low-volume imaging apparatus since not enough films are typically processed in succession for such a condition to be reached.

Figure 6:
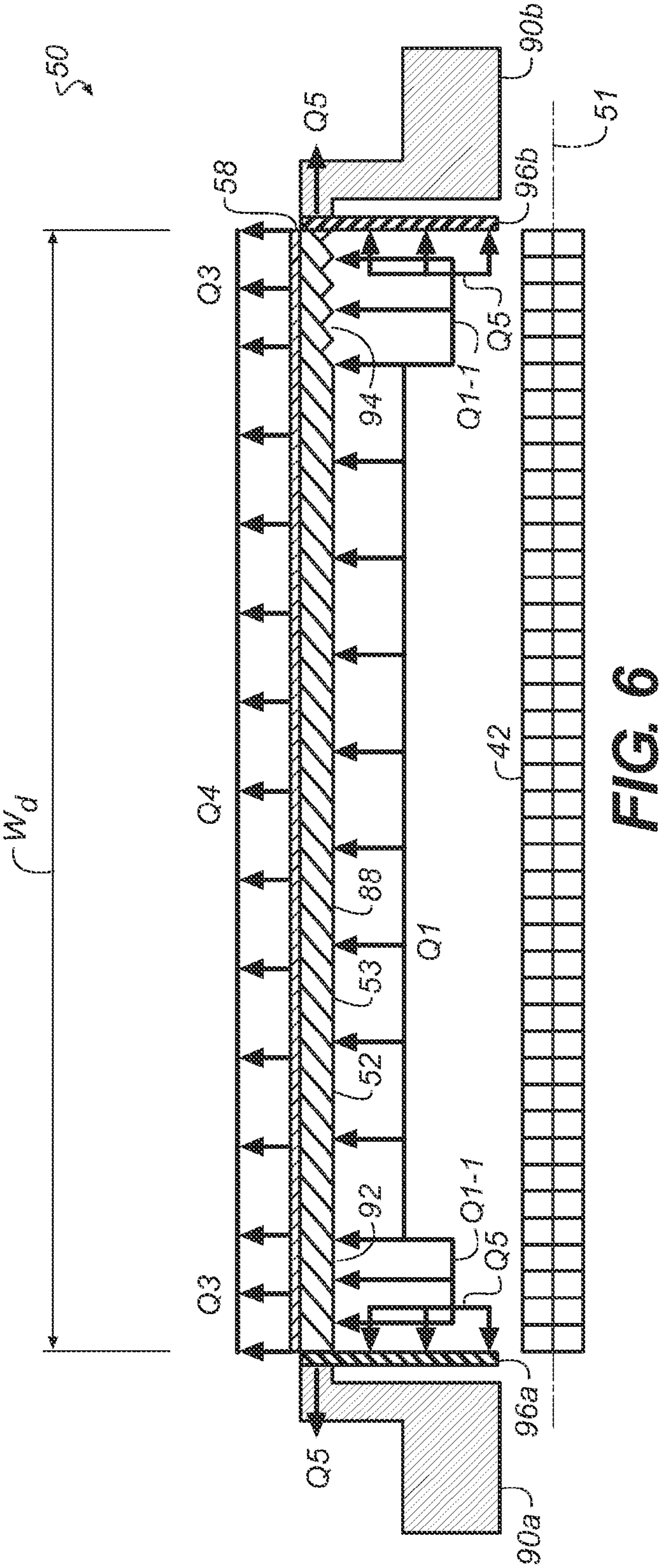
FIG. 6 shows a longitudinal cross-section showing portions of the drum-type processor of FIG. 2 and generally illustrates temperature compensation techniques, according to embodiments of the present disclosure, and generally illustrates heat flows of the drum-type processor when operating in an idle mode.

FIG. 6 is a longitudinal cross-section showing portions of drum-type processor 40 and processor drum 50, and illustrates techniques, according to the present disclosure, for varying one or more radiant energy absorption characteristics of the interior of processor drum 50 so as to compensate for non-uniform heat loss from the drum and to provide the exterior surface of the drum core at a desired temperature which is substantially uniform across the longitudinal width of the drum core. Equation I below represents the amount of heat transfer Q from a radiant heat source (point "A"), such as radiant heater 42, to a receiving surface (Point "b"), such as drum core 52.

$$Q=s*e*F_{ab}*A*(T_a^4-T_b^4); \qquad \text{Equation I}$$

wherein

Q=heat (watts), s=Stefan-Boltzman constant,

A=surface area;

$F_{ab}$=view factor from Point "a" to Point "b" based on A;

$T_a$=temperature at Point "a"; and $T_b$=temperature at Point "b".

According to one embodiment, with reference to FIG. 6, the emissivity of the interior surface 53 of drum core 52 is varied across its longitudinal width between end caps 90*a* and 90*b*. According to one embodiment, the interior surface 53 at end portions 89*a* and 89*b* is treated, as illustrated by the bold line at 92, so as to have a surface emissivity which is greater than that of the emissivity of the interior surface 53 at middle portion 88. For example, according to one embodiment, the interior surface 53 at end portions 89*a*, 89*b* is treated with a coating 92 so as to have an emissivity of 0.8 while the interior surface 53 at middle portion 88 has an emissivity of 0.4. Referring to Equation I, such a treatment will cause approximately twice the amount of thermal energy to be added or absorbed per unit area at end portions 89*a*, 89*b* of drum core 52 relative to middle portion 88. According to one embodiment, drum core 52 comprises aluminum, and the interior surface of end portions 89*a*, 89*b* is anodized so as to have a higher emissivity relative to middle portion 88. Although coating or treatment 92 is shown at one end portion of drum core 52, that being end portion 89*a*, it is noted that coating or treatment 92, when employed, is applied to both end portions 89*a* and 89*b*.

While requirements may change depending upon the reflectivity/emissivity of heat shield 96*a*, 96*b* and on the conductivity Q5 of drum core 52, according to one embodiment, the emissivity of end portions 89*a*, 89*b* is in a range that is 2 to 4 times greater than middle portion 88 of drum core 52. According to one embodiment, middle portion 88 has an emissivity of 0.4 and end portions 89*a*, 89*b* have an emissivity of 0.8. According to one embodiment, an emissivity of end portions 89*a*, 89*b* is in a range from 0.1 to 0.9. According to one embodiment, the emissivity of end portions 89*a*, 89*b* is great than middle portion 88 of drum core 52 such that end portions 89*a*, 89*b* absorb approximately three times the radiant energy absorbed at middle portion 88.

According to one embodiment, a width of each of the end portions 89*a*, 89*b* is in a range from about 5 to 10 percent of the width, $W_d$, of drum core 52. For example, according to such an embodiment, when drum core 52 has a width, $W_d$, of 16-inches, the width of each of the end portions 89*a*, 89*b* will be in a range from about 0.75 to 1.5 inches. According to one embodiment, a width of each of the end portions 89*a*, 89*b* is in a range from about 5 to 15 percent of the width $W_d$ of drum core 52. For example, according to such an embodiment, when drum core 52 has a width $W_d$ of 400 millimeters, the width of each of the end portions 89*a*, 89 will be in a range from approximately 20 to 60 millimeters. According to one embodiment, the width of each of the end portions 89*a*, 89*b* is selected so as to overlap each edge of the maximum width film to be processed on drum core 52 by approximately 25 millimeters.

According to one embodiment, the surface area per unit of length of the interior surface 53 is varied across the longitudinal width of drum core 52 between end caps 90*a* and 90*b*. According to one embodiment, the interior surface 53 at end portions 89*a*, 89*b* is grooved, as illustrated at 94, such that surface area per unit length across the longitudinal width of drum core 52 is greater at end portions 89*a*, 89*b* than at middle portion 88. Due to the increased surface area, the interior surface 53 at end portions 89*a*, 89*b* of drum core 52 will absorb more radiant energy per unit length in than middle portion 88. For example, with reference to Equation I, if the surface area per unit length of end portions 89*a*, 89*b* is twice that of middle portion 88 due to the addition of grooves 94, approximately twice the amount of thermal energy will be absorbed per unit length at end portions 89*a*, 89*b* of drum core 52 relative to middle portion 88. Again, although grooves 94 are shown at one end portion, 89*b*, of drum core 52, it is noted that grooves 94, when employed, are applied to both end portions 89*a* and 89*b*.

With reference to FIGS. 4 and 5, it is noted that heat flow Q5 absorbed from radiant heater 42 by end caps 90*a*, 90*b* is essentially being wasted by being directed to the external environment without heating drum core 52, as illustrated by heat flow Q6. Returning to FIG. 6, according to one embodiment, heat shields 96*a* and 96*b* are respectively coupled to the ends of drum core 52, between drum core 52 and end caps 90*a*, 90*b*, and are positioned between radiant heater 42 and end caps 90*a*, 90*b* so as to redirect radiant energy from radiant heater 42 away from end caps 90*a*, 90*b* to end portions 89*a*, 89*b* of drum core 52, and thereby increase the amount of radiant energy absorbed at end portions 89*a*, 89*b*. According to one embodiment, heat shields 96*a*, 96*b* comprise aluminum having a low emissivity surface. Additionally, although illustrated as being planar in FIG. 6, according to other embodiments, heat shields 96*a*, 96*b* may be shaped or angled so as to better direct radiant energy away from end caps 90*a*, 90*b* to end portions 89*a*, 89*b* of drum core 52. According to one embodiment, heat shields 96*a*, 96*b* comprise a highly conductive material that enables heat to be conducted from heat shields 96*a*, 96*b* to end portions 89*a*, 89*b*, in addition to having a low emissivity for redirecting radiant energy to end portions 89*a*, 89*b*.

By employing using the above described techniques, either alone or one or more in combination with one another, to vary one or more radiant energy absorption characteristics of the interior of drum 50, additional radiant energy is directed to and absorbed by end portions 89*a*, 89*b* of drum core 52. As illustrated by FIG. 6, Q1 represent the thermal energy or heat flow into the middle portion 88 of drum core 52 from radiant heater 42, and Q1-1 represents the thermal energy or heat flow into end portions 89*a*, 89*b* of drum core 52. As illustrated by FIG. 6, which shows the heat flows of drum-type processor 40 when operating in idle mode, the heat flow Q1-1 into end portions 89*a*, 89*b* of drum core 52 is greater than heat flow Q1 into middle portion 88 of drum core 52 as compared to that shown in FIG. 4, which compensates for the heat loss Q5 flowing from end caps 90*a*, 90*b* such that the temperature of exterior surface 54 (or coating 58 if employed) is substantially uniform across the entire longitudinal width, $W_d$, of drum core 52. By providing a substantially uniform temperature across the longitudinal width, Wd, of exterior surface 54 of drum core 52, when a sheet of film 44 is thermally developed, the film 44 is processed uniformly across the sheet such that the so-called cross-web processing or development of the film 44 is substantially uniform, thereby reducing or eliminating visual artifacts in the developed film 44.

While the above primarily regards varying the radiant energy absorption characteristics of the interior of drum core 52 (e.g. emissivity) so as to achieve uniform cross-web processing, it is also important to achieve a uniform down-web processing (i.e. in a direction about the circumference of drum core 52) as film 44 is developed. According to one embodiment, to achieve a uniform down-web processing, the emissivity levels of the interior of drum core 52 are kept at sufficiently low levels so that radiant energy reflects or "bounces around" the drum such that radiant energy is evenly distributed about the radial circumference of drum core 52 (e.g. see FIG. 3). It is noted that keeping the emissivity levels of the interior of the drum core as such levels also helps to reduce the potential for "shadow effects" caused by wiring within the drum core (e.g. for radiant heater 42 and temperature sensor 80) which can block radiant energy from radiant heater 42 and create a "shadow" on the interior of drum core 52 that could result in a "cold spot" in drum core 52 and produce an image artifact.

According to one embodiment, to achieve uniform down-web thermal processing of the film, drum core 52 is formed from aluminum, which has desirable heat transfer characteristics that evenly conducts and distributes heat about the surface of drum core 52. Another technique for achieving uniform down-web processing is to accurately monitor the temperature about the circumference of drum core 52 and to adjust the power provided to radiant heater 42 based on such measurements.

Figure 7:
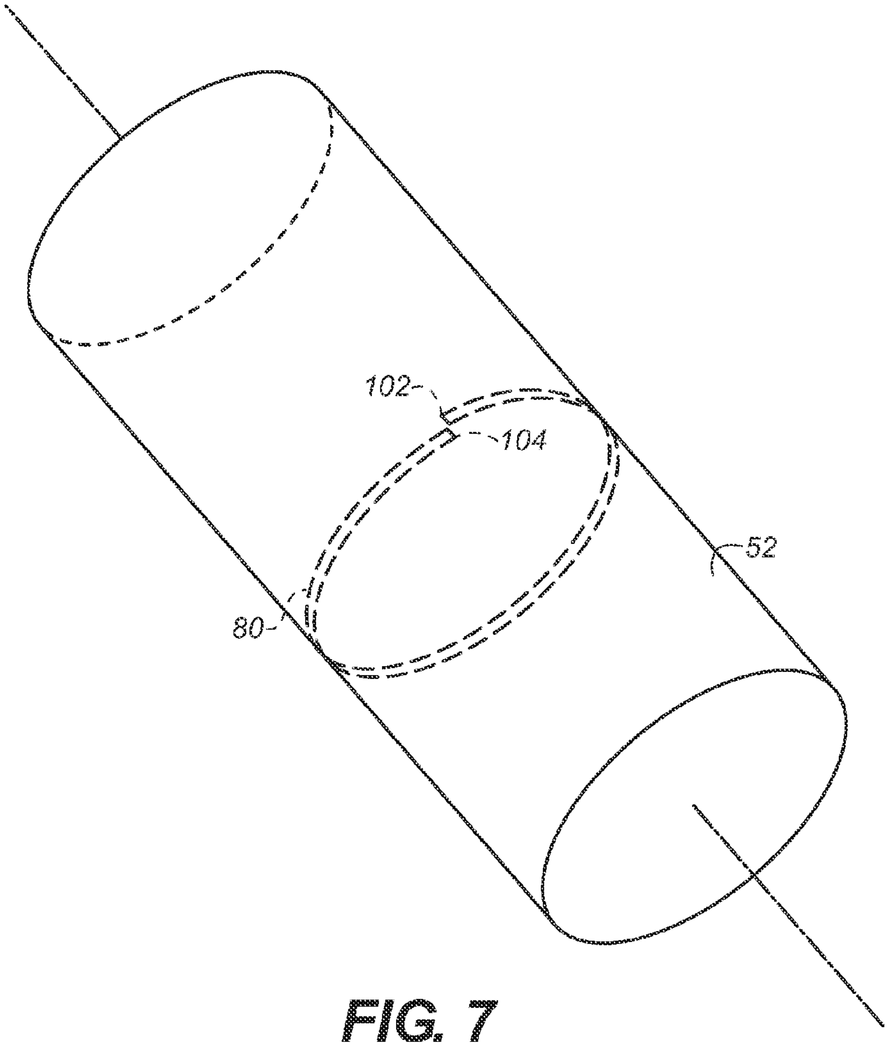
FIG. 7 shows a temperature sensor within a drum core, according to one embodiment.

FIG. 7 is a diagram generally illustrating a temperature sensor 80 disposed about an internal circumference of drum core 52, a so-called "full-ring" temperature sensor, which is configured to measure the temperature of drum core 52. A length of temperature sensor 80 is greater than the internal circumference of drum core 52, and temperature sensor 80 is positioned such that ends 102 and 104 are offset from and overlap one another. By overlapping in this fashion, temperature sensor 80 is able to measure a temperature about a complete circumference of drum core 52. According to one embodiment, temperature sensor 80 comprises and RTD temperature sensor.

Figure 8:
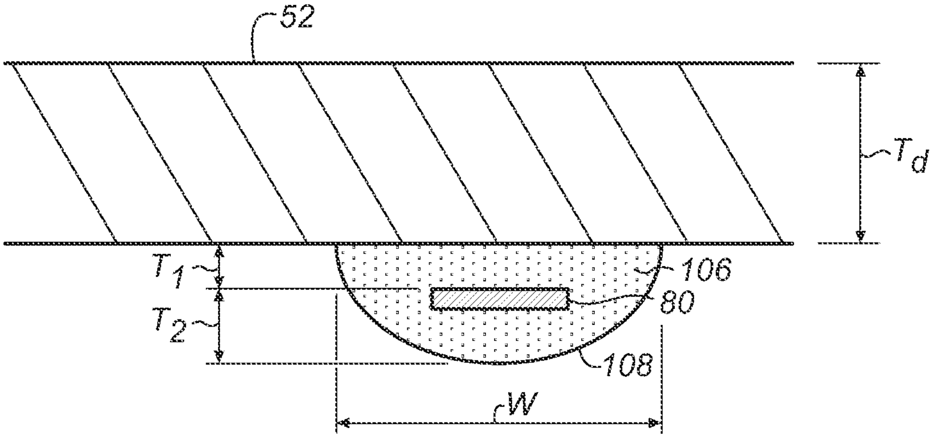
FIG. 8 shows a cross-sectional view of the temperature sensor and drum core of FIG. 7, according to one embodiment.

FIG. 8 is a cross-sectional view through temperature sensor 80 and a portion of drum core 52. Temperature sensor 80 is embedded within an insulating material 106. According to one embodiment, a thickness $T_1$ of insulating material 106 between temperature sensor 80 and drum core 52 is thinner than a thickness $T_2$ of insulating material 106 on the interior facing side of temperature sensor 80. The thicker insulating material 106 on the interior side of temperature sensor 80 reduces convection and conduction heating of temperature sensor 80 from heated air within the interior of drum core 52 that would otherwise skew the temperature measurements of drum core 52 provided by temperature sensor 80.

Temperature sensor 80 and insulating material 106 can block radiant energy from being absorbed by drum core 52 and create a "cold" ring around the circumference of drum core 52 which could potentially create image artifacts in developed films. As such, width W of temperature sensor 80 and insulating material 106 should be kept as narrow possible, but width W is dependent on thickness $T_d$ of drum core 52. According to one embodiment, width W of temperature sensor 80 and insulating material 106 must not be more than twice a thickness $T_d$ of drum core 52.

According to one embodiment, insulating material 106 is covered with a low-emissivity overcoat layer 108, to shield temperature sensor 80 from radiant energy from radiant heater 42 which, again, would otherwise skew the temperature measurements of drum core 52 provided by temperature sensor 80. According to one embodiment, overcoat layer 108 is an aluminum foil. According to one embodiment, the emissivity of overcoat layer 108 is lower than that of adjacent interior surfaces of drum core 52. For example, according to one embodiment, interior surfaces in middle portion 88 of drum core 52 have an emissivity of 0.4 and overcoat layer 108 has an emissivity of 0.2. By employing temperature sensor 80 as described above, accurate temperature measurements can be obtained about the entire circumference of drum core 52. The power provided to radiant heater 42 can be adjusted based on such temperature measurements to adjust the amount of radiant energy provided and maintain drum core 52 at a desired temperature about its entire circumference, thereby improving uniformity of the down-web processing of the film.

The invention has been described in detail with particular reference to certain preferred embodiments thereof, but it will be understood that variations and modifications can be effected within the spirit and scope of the invention.

What is claimed is:

1. A method of operating a thermal processor for thermally developing photothermographic film, comprising:

positioning a radiant heater within an interior of a rotating hollow drum, the radiant heat providing radiant energy to heat the hollow drum; and modifying radiant energy absorption characteristics of an interior surface of the hollow drum so that selected areas of the interior surface of the drum absorb more radiant energy than other areas of the interior surface of the drum in order to compensate for non-uniform heat loss from the hollow drum so that the exterior surface of the hollow drum has a temperature which is substantially uniform across a longitudinal width of the drum, wherein modifying the radiant energy absorption characteristics comprises grooving an interior surface of end portions of the hollow drum such that the interior surface of the end portions of the hollow drum have a greater surface area per unit length in a longitudinal direction of the hollow drum than the interior surface in a middle portion of the hollow drum.

2. A method of operating a thermal processor for thermally developing photothermographic film, comprising:

providing a rotatable hollow drum including a drum core having an interior surface and an exterior surface;

providing a radiant heater positioned within an interior of the drum and configured to provide radiant energy to heat the drum; and varying at least one radiant energy absorption characteristic of the interior of the drum across its longitudinal width whereby selected areas of the interior of the drum absorb more radiant energy than other areas of the interior of the drum to compensate for non-uniform heat loss from the drum and to provide the exterior surface of the drum core at a desired temperature which is substantially uniform across a longitudinal width of the drum core, wherein the at least one radiant energy absorption characteristic comprises an emissivity of the interior surface of the drum core, and wherein the emissivity of the interior surface of the drum core varies across the lateral width of the drum core; wherein the emissivity is greater at end portions of the interior surface of the drum core relative to a middle portion of the interior surface of the drum core; and wherein the end portions of the interior surface of the drum core are coated with a material that increases the emissivity of the end portions relative to the interior surface of the middle portion of the drum core.

3. The method of claim 2, further comprising grooving the end portions of the interior surface of the drum core whereby the surface area per unit length across the longitudinal width of the drum core is greater at the end portions than at the middle portion.

4. A method of operating a thermal processor for thermally developing photothermographic film, comprising:

providing a rotatable hollow drum including a drum core having an interior surface and an exterior surface;

providing a radiant heater positioned within an interior of the drum and configured to provide radiant energy to heat the drum;

varying at least one radiant energy absorption characteristic of the interior of the drum across its longitudinal width whereby selected areas of the interior of the drum absorb more radiant energy than other areas of the interior of the drum to compensate for non-uniform heat loss from the drum and to provide the exterior surface of the drum core at a desired temperature which is substantially uniform across a longitudinal width of the drum core; and providing a temperature sensor mounted to and extending about a circumference of the interior of the middle portion of the drum core, the temperature sensor being coated with a material having an emissivity less than an emissivity of the interior surface of the middle portion of the drum core.

5. The method of claim 4, further comprising grooving end portions of the interior surface of the drum core whereby the surface area per unit length across the longitudinal width of the drum core is greater at the end portions than at the middle portion.

* * * * *